(12) United States Patent
Ohtomo et al.

(10) Patent No.: US 7,115,852 B2
(45) Date of Patent: Oct. 3, 2006

(54) PHOTODETECTION DEVICE FOR ROTARY LASER SYSTEM

(75) Inventors: Fumio Ohtomo, Tokyo-to (JP); Kazuki Osaragi, Tokyo-to (JP); Kunihiro Hayashi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 10/955,589

(22) Filed: Sep. 30, 2004

(65) Prior Publication Data

US 2005/0077454 A1   Apr. 14, 2005

(30) Foreign Application Priority Data

Oct. 14, 2003   (JP) .............................. 2003-353826

(51) Int. Cl.
*G01C 21/24* (2006.01)
*G01C 21/02* (2006.01)

(52) U.S. Cl. ................ 250/206.2; 250/206.1; 250/206.2; 356/141.3; 359/820

(58) Field of Classification Search .......... 250/231.13, 250/206.1–206.3; 356/139.07, 141.3, 255; 359/205, 820, 822; 33/291
See application file for complete search history.

(56) References Cited

U.S. PATENT DOCUMENTS

| 4,441,809 A | 4/1984 | Dudley et al. ................. 356/1 |
| 5,767,960 A * | 6/1998 | Orman ................... 356/139.03 |
| 2003/0090652 A1 | 5/2003 | Detweiler et al. ........ 356/141.4 |
| 2003/0136901 A1* | 7/2003 | Ohtomo et al. ............. 250/234 |
| 2003/0174305 A1 | 9/2003 | Kasper et al. ............. 356/3.09 |

FOREIGN PATENT DOCUMENTS

| EP | 1 174 682 | 1/2002 |
| JP | 2002-39755 | 2/2002 |
| JP | 2002-286448 | 10/2002 |
| JP | 2002-286450 | 10/2002 |
| JP | 2002-287080 | 10/2002 |
| JP | 2004-212058 | 7/2004 |
| JP | 2005-121386 | 5/2005 |
| JP | 2005-121387 | 5/2005 |
| JP | 2005-274228 | 10/2005 |
| JP | 2005-274229 | 10/2005 |

* cited by examiner

*Primary Examiner*—Stephone B. Allen
*Assistant Examiner*—Patrick J. Lee
(74) *Attorney, Agent, or Firm*—Nields & Lemack

(57) ABSTRACT

A photodetection device for a rotary laser system for projecting at least two fan-shaped beams tilted at a known angle with respect to a horizontal plane and having a known spreading angle, comprising at least three photodetectors arranged in a known relationship.

6 Claims, 11 Drawing Sheets

PHOTODETECTION DEVICE FOR ROTARY LASER SYSTEM

BACKGROUND OF THE INVENTION

The present invention relates to a photodetection device for receiving a laser beam projected by rotary irradiation and for measuring an operating position according to photodetecting condition.

In the past, as a representative system for forming a reference plane by projecting a laser beam in rotary irradiation, a system has been known, which comprises a rotary laser system and a photodetection device installed at a measuring point for receiving a laser beam from the rotary laser system.

The rotary laser system projects a laser beam each having a spot-like cross-section by rotary irradiation and forms a reference plane. For instance, by projecting a laser beam within a horizontal plane by rotary irradiation, a horizontal reference plane is formed. By projecting the laser beam within a vertical plane, a vertical reference plane is formed. By projecting the laser beam within a tilted plane, a tilted reference plane is formed.

The photodetection device has a photodetector for receiving and detecting the laser beam. Based on the laser beam detected by the photodetector, a horizontal reference position, a vertical reference position, etc. are measured. Further, when the rotary laser system projects the laser beam in rotary irradiation, the photodetection device detects the laser beam. Based on the result of detection, a distance between the photodetection device and the rotary laser system is measured.

In general, the photodetection device comprises a photodetector with a predetermined length mounted at a predetermined position on a rod-like body. The relation between the photodetection device and the reference plane is detected according to a photodetecting position of the laser beam by the photodetector, and the photodetection device is moved to an adequate position. The photodetection device is erected for installation at a measuring point by an operator. The photodetector receives the laser beam when the operator moves the photodetection device as necessary up and down, for example. Thus, the photodetector must have a certain length.

However, when civil engineering work is carried out for a wider range, a distance between the rotary laser system and the photodetection device will be longer, and the length of the photodetector also will be longer in view of the working efficiency.

In this respect, JP-A-2002-39755 proposes a measuring system, which can detect positional relation between the photodetector and the laser beam only by the photodetection device, which merely comprises a spot-like photodetector.

According to JP-A-2002-39755, a rotary laser system projects a plurality of tilted fan-shaped laser beams by rotary irradiation to facilitate the receiving of the laser beams by the photodetection device, and deviation of the laser beams from a reference position is detected according to time difference caused when the photodetector receives the plurality of fan-shaped laser beams. This makes it possible to perform communication between the photodetection device and the rotary laser system when communication data are superimposed on the laser beams. An amount of deviation and a direction of deviation are transmitted to the photodetection device, and a position of the photodetection device can be accurately adjusted.

However, the invention described in JP-A-2002-39755 is based on the assumption that the photodetection device is held at the vertical position. This means, for example, the system has to be constructed in such manner that a tilt sensor or the like should be provided on the photodetection device side, and that an operator must hold the photodetection device at the vertical position. As a result, the photodetection device must have complicated structure. Also, there are such complicated procedures that the operator must hold the photodetection device at the vertical position while paying attention to the tilt sensor. When a distance is measured by the photodetection device and the rotary laser system, a lower end of the photodetection device acts as a measuring point. When the photodetection device is tilted, there has been such problem that the deviation between the lower end and the photodetection device may directly cause a measurement error.

Further, there has been a problem in that there must be provided measuring means separately for the measurement of the distance between the rotary laser system and the photodetection device.

SUMMARY OF THE INVENTION

It is an object of the present invention to provide a photodetection device, in which an amount of tilting and a tilting direction can be detected when the photodetection device is tilted, and an accurate reference position can be detected and surveyed even when the photodetection device is tilted, and by which the structure of the photodetection device can be simplified and the burden on an operator can be alleviated.

To attain the above object, the present invention provides a photodetection device for a rotary laser system for projecting at least two fan-shaped beams tilted at a known angle with respect to a horizontal plane and having a known spreading angle, comprising at least three photodetectors arranged in a known relationship. Also, the present invention provides the photodetection device for the rotary laser system as described above, wherein at least one of the photodetectors is provided at a position deviated from a line connecting the photodetectors with each other. Further, the present invention provides the photodetection device for the rotary laser system as described above, wherein at least two of the three or more photodetectors are provided on a plane facing to the rotary laser system, and at least one of the photodetectors is provided at a position deviated from the plane. Also, the present invention provides the photodetection device for the rotary laser system as described above, wherein the photodetection device comprises an arithmetic operation unit for calculating a distance between the rotary laser system and the photodetection device based on time difference in the receiving of the fan-shaped beams by the photodetectors. Further, the present invention provides the photodetection device for the rotary laser system as described above, wherein the photodetection device comprises a tilt detecting device. Also, the present invention provides the photodetection device for the rotary laser system as described above, wherein there is provided an arithmetic operation unit for calculating a tilt angle and a twist angle of the photodetection device based on a distance between the rotary laser system and the photodetection device and based on time difference in the receiving of the fan-shaped beams by the photodetectors. Further, the present invention provides the photodetection device for the rotary laser system as described above, wherein the distance between the rotary laser system and the photodetection device is compensated based on the tilt angle and the twist angle of the photodetection device. Also, the present invention provides the photodetection device for the rotary laser system as described above, wherein the rotary laser system is installed at a known point, the photodetection device comprises a GPS measuring device and an arithmetic operation unit, the arithmetic operation unit calculates a distance between the rotary laser system and the photodetection device based on a result of measurement by the GPS measuring device, a tilt angle of the photodetection device is calculated based on the calculated distance and based on time difference of the receiving of the fan-shaped beams by the photodetectors, and the result of measurement by the GPS measuring device is compensated based on the tilt angle.

The present invention provides a photodetection device for a rotary laser system for projecting at least two fan-shaped beams tilted at a known angle with respect to a horizontal plane and having a known spreading angle, comprising at least three photodetectors arranged in a known relationship. As a result, the distance between the rotary laser system and the photodetection device can be calculated according to photodetecting condition at three photodetectors.

Also, according to the present invention, at least one of the photodetectors is provided at a position deviated from the plane. As a result, a tilt angle and a twist angle of the photodetection device can be detected from the photodetecting conditions of three or more photodetectors.

Further, according to the present invention, the distance between the rotary laser system and the photodetection device is compensated based on the tilt angle and the twist angle of the photodetection device. Also, the rotary laser system is installed at a known point, the photodetection device comprises a GPS measuring device and an arithmetic operation unit, the arithmetic operation unit calculates a distance between the rotary laser system and the photodetection device based on a result of measurement by the GPS measuring device, a tilt angle of the photodetection device is calculated based on the calculated distance and based on time difference of the receiving of the fan-shaped beams by the photodetectors, and the result of measurement by the GPS measuring device is compensated based on the tilt angle. Thus, it is possible to perform accurate measurement without the need of holding the photodetection device at the vertical position.

DETAILED DESCRIPTION OF THE PREFERRED EMBODIMENTS

Description will be given below on the best mode for carrying out the invention referring to the drawings.

Figure 1:
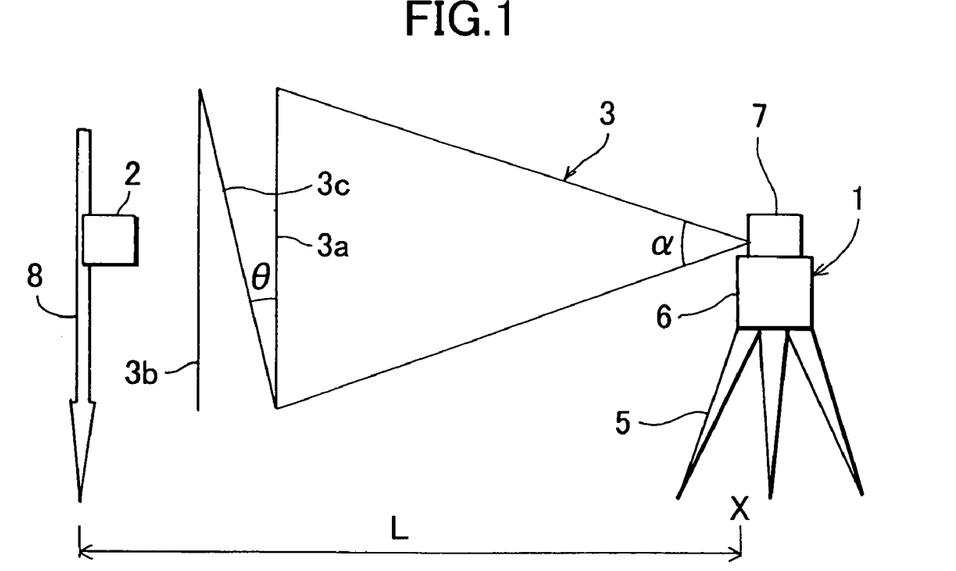
FIG. 1 is a schematical drawing of an embodiment of the present invention.
Figure 2:
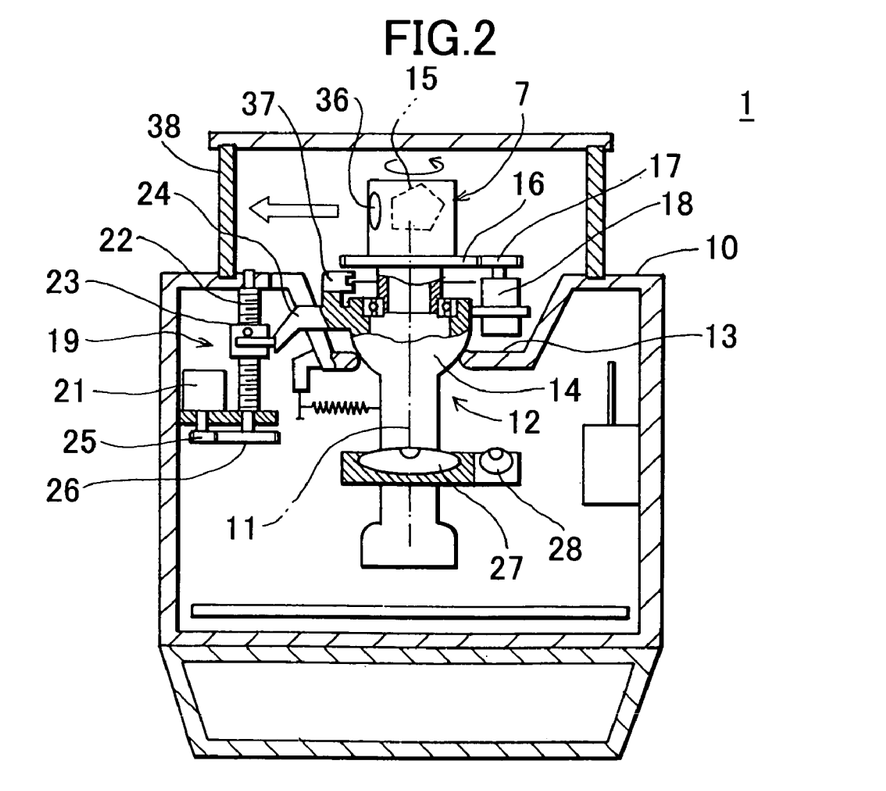
FIG. 2 is a cross-sectional view of a rotary laser system used in the embodiment of the present invention.
Figure 3:
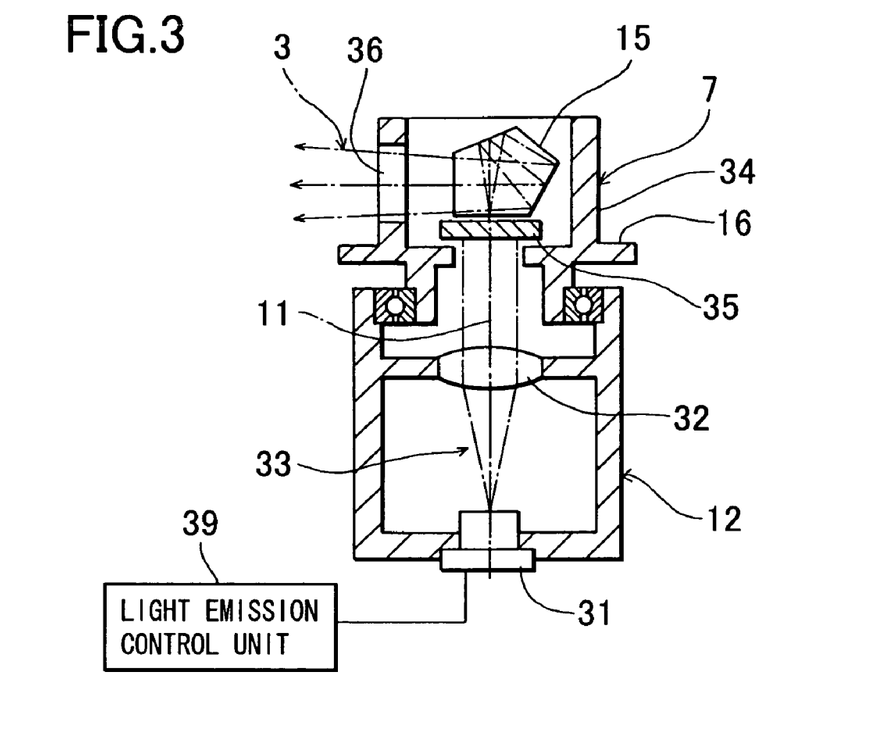
FIG. 3 is a cross-sectional view of a laser projector of the rotary laser system.

First, referring to FIG. 1 to FIG. 3, description will be given on general outline of a rotary laser system and a photodetection device to be used in an embodiment of the present invention.

A rotary laser system 1 projects a plurality of fan-shaped laser beams by rotary irradiation, and a photodetection device 2 comprises at least two photodetectors for receiving the fan-shaped laser beams.

A tripod 5 is installed at a point approximately aligned with an approximately known point X, and the rotary laser system 1 is mounted on the tripod 5. The rotary laser system 1 comprises a main unit 6 and a rotating unit 7 rotatably mounted on the main unit 6. From the rotating unit 7, a laser beam 3 is projected by rotary irradiation at a constant rate. The photodetection device 2 is held by support means as required. FIG. 1 shows a condition in outdoor operation, and the photodetection device 2 is mounted on a rod 8, which can be hand-carried by an operator.

The laser beam 3 comprises a plurality of fan-shaped beams. For instance, the laser beam 3 comprises vertical fan-shaped beams 3a and 3b and a fan-shaped beam 3c tilted with respect to the fan-shaped beams 3a and 3b at a known angle θ on a diagonal line to form N-shaped configuration. Also, the fan-shaped beams 3a and 3b are projected in directions of ±δ with a spreading angle of a respectively (See FIG. 6). The fan-shaped beams 3a and 3b are not necessarily vertical beams. It is merely required that the fan-shaped beams 3a and 3b are running in parallel to each other and are crossing the horizontal plane.

Now, description will be given on the rotary laser system 1 referring to FIG. 2 and FIG. 3.

The rotary laser system 1 according to the present embodiment comprises a casing 10 and a laser projector 12 with a projection optical axis 11 (to be described later). The laser projector 12 is tiltably accommodated in the casing 10.

A recessed portion 13 in form of a truncated cone is provided at a center on an upper surface of the casing 10, and the laser projector 12 is penetrating though a center of the recessed portion 13 in an up-to-bottom direction. The laser projector 12 is supported on the recessed portion 13 via a spherical seat 14 so that the laser projector 12 can be tilted. On an upper portion of the laser projector 12, the rotating unit 7 is rotatably mounted, and a pentagonal prism 15 is provided on the rotating unit 7.

A scanning gear 16 is mounted on the rotating unit 7. A scanning motor 18 with a driving gear 17 is provided on the laser projector 12. The rotating unit 7 is rotated and driven by the scanning motor 18 via the driving gear 17 and the scanning gear 16.

Inside the casing 10, there are provided two sets of tilting mechanisms 19 (only one of the tilting mechanisms 19 is shown in the figure) around the laser projector 12. The tilting mechanism 19 comprises a motor for tilting 21, a screw for tilting 22 with a center of rotation in parallel to the laser projector 12, and a tilting nut 23 engaged with the screw for tilting 22.

The laser projector 12 has two tilting arms 24 (only one of the tilting arms 24 is shown) extending in two directions perpendicular to the projection optical axis 11, and the tilting arms 24 cross each other perpendicularly. At a tip of the tilting arm 24, a pin with a circular cross-section is protruded, and the tilting arm 24 is engaged with the tilting mechanism 19 via the pin.

The motor for tilting 21 can rotate the screw for tilting 22 via a driving gear 25 and a gear for tilting 26. When the screw for tilting 22 is rotated, the tilting nut 23 is moved in an up-to-bottom direction. By the movement of the tilting nut 23 in the up-to-bottom direction, the tilting arm 24 is tilted, and the laser projector 12 is tilted. Another set of the tilting mechanism not shown in the figure tilts the laser projector 12 in a direction running perpendicularly to the tilting direction of the tilting mechanism 19 by the same mechanism as the tilting mechanism 19.

There are provided a fixed tilt sensor 27 in parallel to the tilting arm 24 and a fixed tilt sensor 28 directed perpendicularly to the tilting arm 24 at a middle portion of the laser projector 12. A tilt angle in an arbitrary direction of the laser projector 12 can be detected based on the fixed tilt sensors 27 and 28. Based on the results of detection by the fixed tilt sensors 27 and 28, the laser projector 12 is tilted via the two tilting arms 24 by the two sets of the tilting mechanisms 19, and it can be so controlled that the laser projector 12 is always directed in a vertical direction. Also, the laser projector 12 can be tilted at any angle as desired.

Now, description will be given on the laser projector 12 and the rotating unit 7 referring to FIG. 3.

A laser beam emitting unit 31 and a collimator lens 32 arranged on the projection optical axis 11 make up together a projection optical system 33, and the projection optical system 33 is accommodated in the laser projector 12.

The rotating unit 7 has a prism holder 34. The prism holder 34 holds the pentagonal prism 15 and a diffraction grating (BOE) 35 provided on a lower side of the pentagonal prism 15.

The laser beam 3 emitted from the laser beam emitting unit 31 is turned to a parallel luminous flux by the collimator lens 32 and enters the diffraction grating 35. The incident laser beam 3 is divided to form three fan-shaped beams $3a$, $3b$ and $3c$ by the diffraction grating 35. The fan-shaped beams $3a$, $3b$ and $3c$ are deflected in a horizontal direction by the pentagonal prism 15, and these beams are projected through a projection window 36 of the prism holder 34.

The diffraction grating 35 may be arranged at a position where the laser beams 3 pass through after being deflected by the pentagonal prism 15. In FIG. 2, reference numeral 37 denotes an encoder for detecting a rotation angle of the rotating unit 7, and 38 represents a transparent cover in cylindrical shape.

Light emitting condition of the laser beam emitting unit 31 is controlled by a light emission control unit 39. For instance, by such a method as to modulate the laser beam 3, communication data can be superimposed on the laser beam 3. Optical communication can be performed to send data such as position information of the rotary laser system 1 in a direction of rotary irradiation toward the photodetection device 2.

A separate radio communication equipment may be provided as communication means, and the data may be transmitted to the photodetection device 2 via radio communication.

Figure 4:
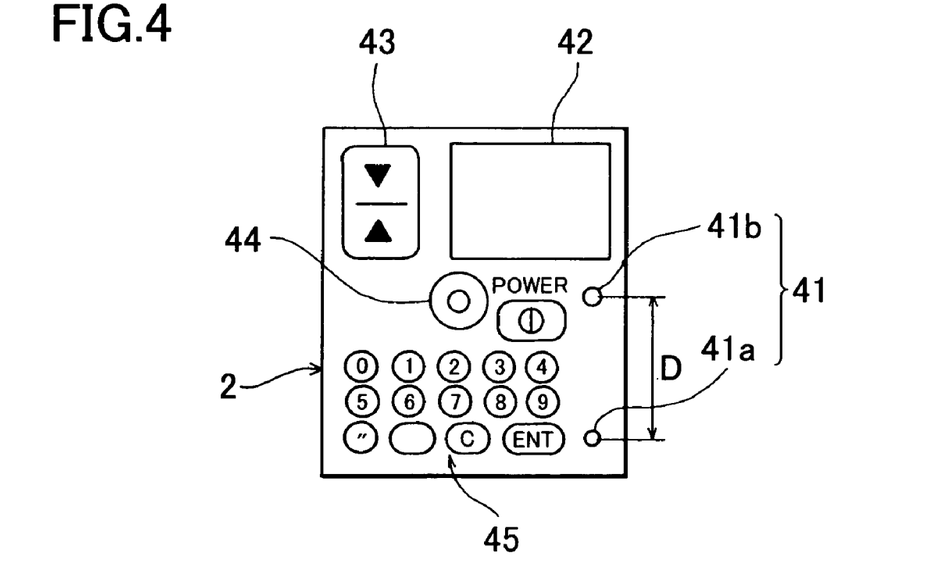
FIG. 4 is a front view of a photodetection device used in the embodiment of the present invention.
Figure 5:
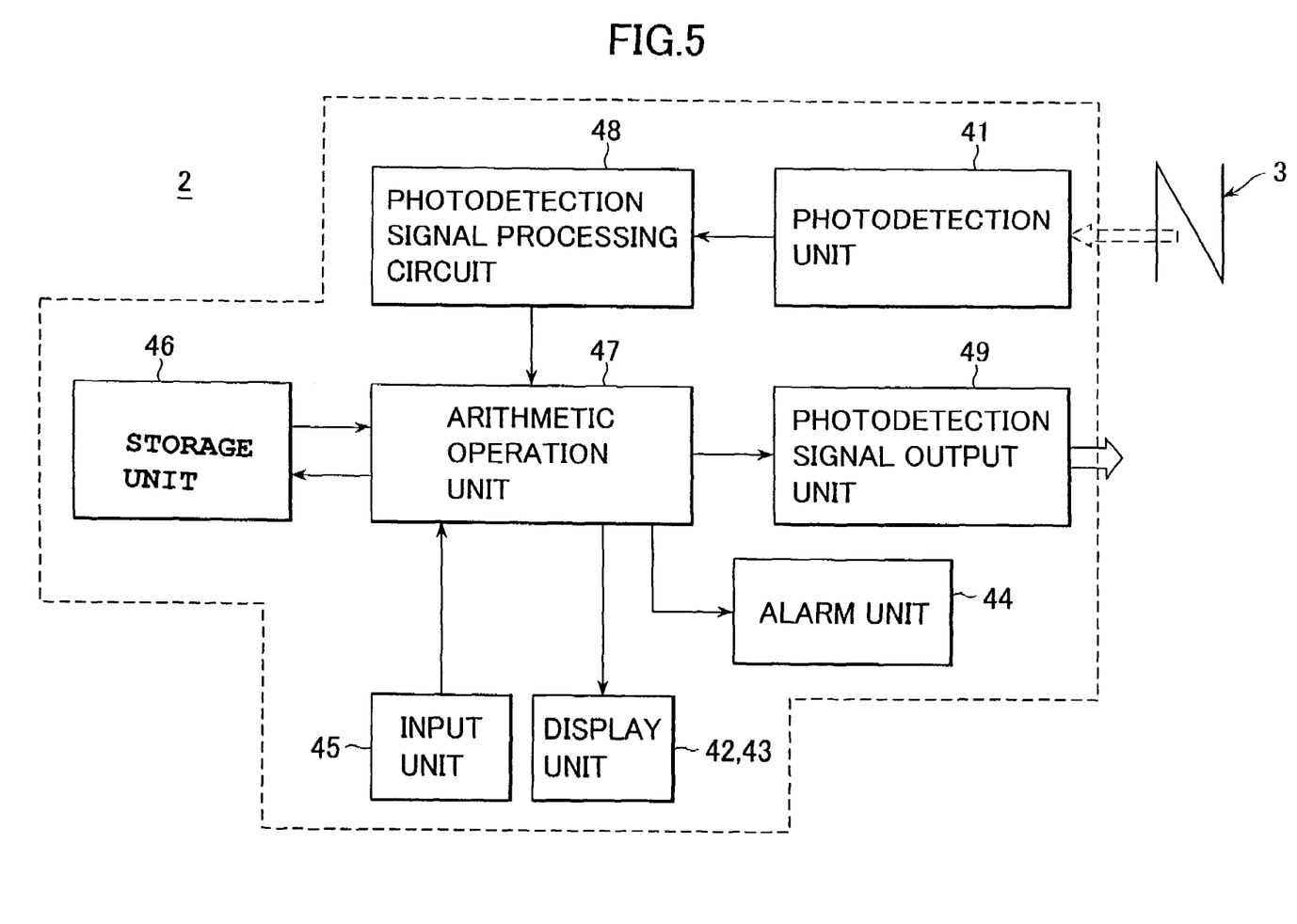
FIG. 5 is a schematical block diagram of the embodiment of the present invention.

Next, description will be given on the photodetection device 2 referring to FIG. 4 and FIG. 5.

The photodetection deice 2 comprises photodetection unit 41 for detecting the fan-shaped beams $3a$, $3b$ and $3c$, a display unit 42, an index display unit 43, an alarm unit 44 such as a buzzer and an input unit 45 such as input keys. The photodetection unit 41 comprises a plurality of photodetectors $41a$ and $41b$ having light emitting elements such as laser diodes arranged at two positions, for example, above and under respectively. A distance D between the photodetector $41a$ and the photodetector $41b$ is set to a known value. Further, the photodetection device 2 incorporates a storage unit 46, an arithmetic operation unit 47, a photodetection signal processing circuit 48, and a photodetection signal output unit 49.

Figure 8:
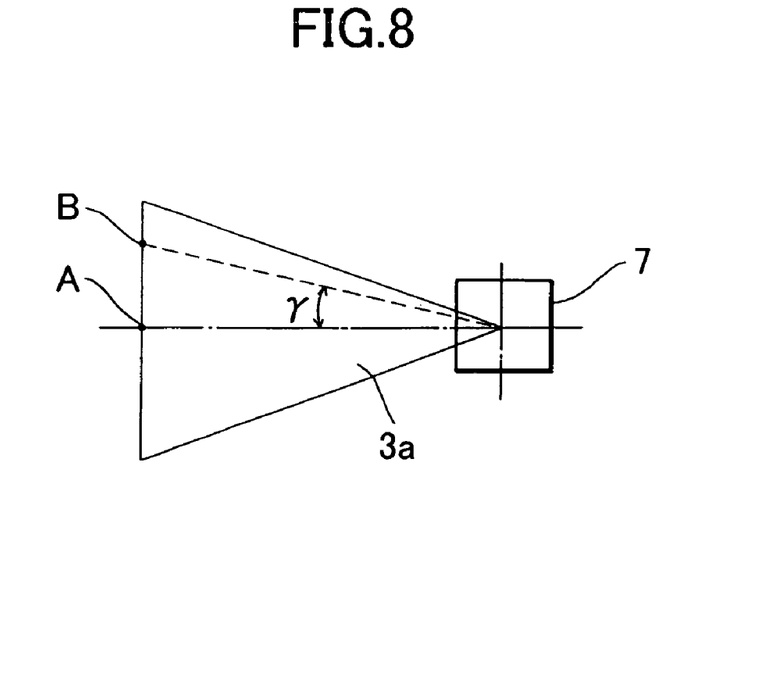
FIG. 8 is a side view to explain operation of the embodiment of the present invention.
Figure 9:
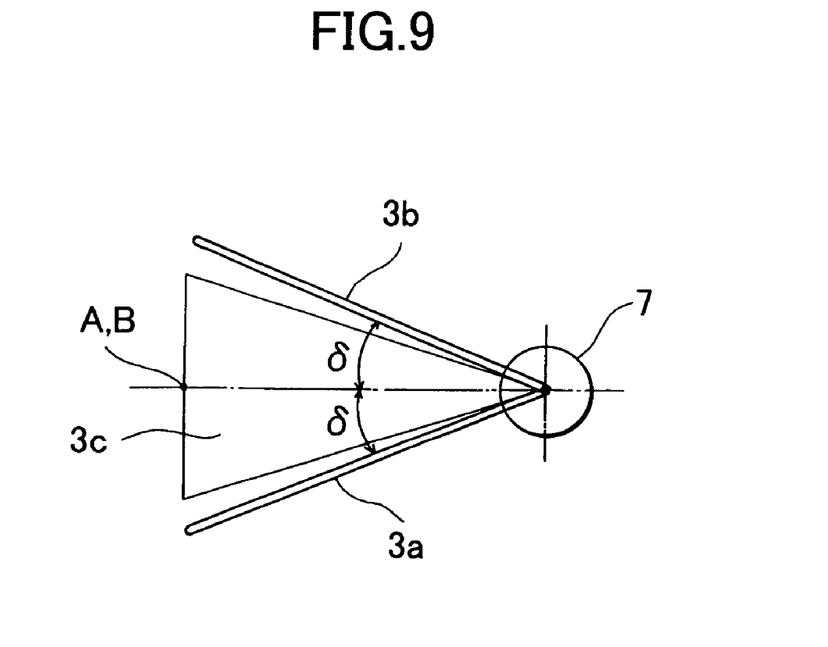
FIG. 9 is a plan view to explain operation of the embodiment of the present invention.

On the display unit 42, there is displayed an angle between a straight line connecting the rotation center point of the laser beams 3 with the photodetector 41 and a horizontal reference plane (elevation angle r; See FIG. 8). Also, a distance between the photodetection device 2 and the rotary laser system 1 is displayed. The index display unit 43 comprises an index having a central line and upper and lower triangular marks. When a scanning position of the laser beams 3 is at the center of the horizontal line, it is shown by the center line. When the scanning position of the laser beams 3 is above or under the center of the horizontal line, it is shown by the triangular marks.

When the fan-shaped beams $3a$, $3b$ or $3c$ are received, a photodetection signal is inputted from the photodetection unit 41 to the photodetection signal processing circuit 48. Then, it is detected whether the light has been received or not. The signal is processed by the required processing such as A/D conversion. Also, communication data superimposed on the fan-shaped beams $3a$, $3b$ or $3c$ is extracted and analyzed, and the result is inputted to the arithmetic operation unit 47. As described later, based on the signal from the photodetection signal processing unit 48, the arithmetic operation unit 47 calculates the elevation angle γ. Further, based on the positional relation between the photodetector $41a$ and the photodetector $41b$, a distance L between the rotary laser system 1 and the photodetection device 2 and tilting of the rod 8 is calculated. By the arithmetic operation unit 47, the result of calculation is inputted to the storage unit 46 or it is displayed on the display unit 42. Also, the result of calculation is transmitted to the rotary laser system 1 by the photodetection signal output unit 49 via optical communication.

Position information such as the position of the known point X may be inputted to the storage unit 46 in advance by the input unit 45. In case the rotary laser system 1 comprises a radio equipment as communication means, a radio receiver is provided on the photodetection device 2.

The photodetection signal output unit 49 outputs the result obtained from the calculation by the arithmetic operation unit 47. The output from the photodetection signal output unit 49 is used as a signal to drive the index display unit 43.

Description will be given below on operation referring to FIG. 6–FIG. 10.

The rotary laser system 1 is installed at the known point X via the tripod 5. Based on the result of detection by the fixed tilt sensors 27 and 28, the tilting mechanisms 19 are driven so that the laser projector 12 is adjusted to the vertical direction.

The rod 8 is installed at a target position. The photodetection device 2 is mounted at a predetermined height on the rod 8, i.e. at a known height from the ground surface. A distance D between the photodetector 41a and the photodetector 41b is inputted to the photodetection device 2 in advance by the input unit 45. The distance D is stored in the storage unit 46 via the arithmetic operation unit 47.

The height of the photodetection device 2, i.e. differences of height of the photodetectors 41a and 41b with respect to a reference plane, the distance L between the rotary laser system 1 and the photodetection device 2, and elevation angles γ1 and γ2 to the photodetectors 41a and 41b are calculated based on the photodetecting condition of the photodetection signals from the photodetectors 41a and 41b and the distance D.

The elevation angles γ1 and γ2 are calculated by the arithmetic operation unit 47 according to the photodetection signals issued when the fan-shaped beams 3a, 3b and 3c are received by the photodetectors 41a and 41b respectively. When the photodetection unit 41 is deviated from the range of photodetection of the laser beam 3, etc., the alarm unit 44 sounds buzzer, etc., and warns the operator.

Figure 6:
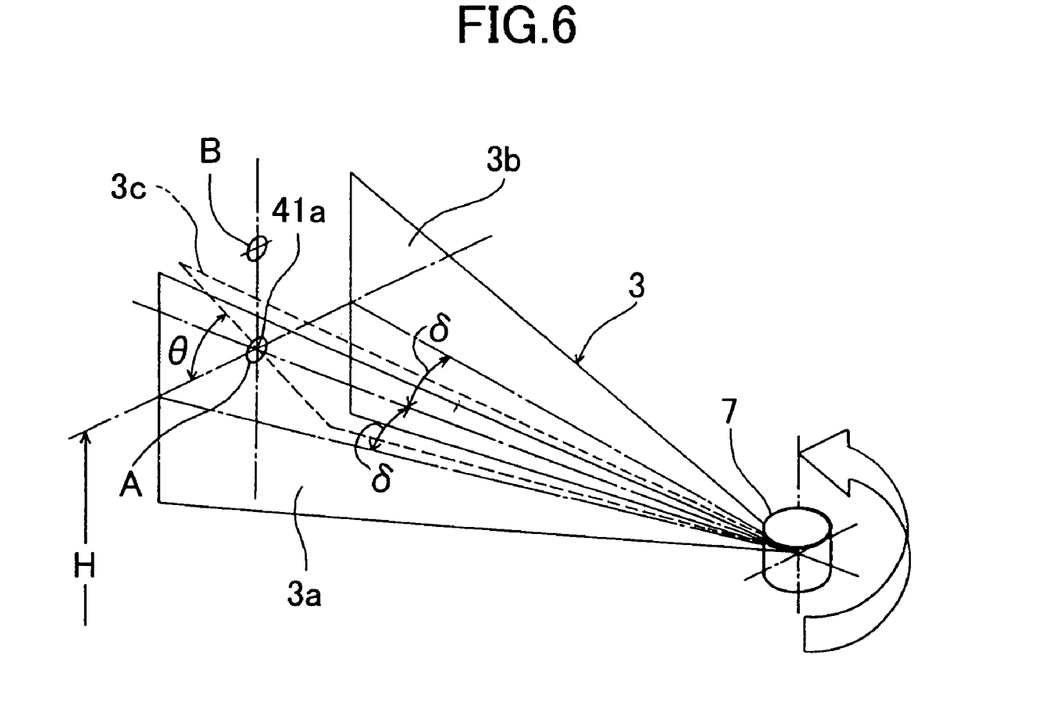
FIG. 6 is a perspective view to show operation of the embodiment of the present invention.

Now, description will be given on the difference of height at the position of the photodetection device 2 with respect to the horizontal line referring to FIG. 6. FIG. 6 shows the relation between the photodetector 41 and the laser beams 3. The height H shows a height of a reference plane, i.e. a center height of the laser beam 3, namely a horizontal line.

When the laser beam 3 is projected by rotary irradiation, the laser beam 3 runs across the photodetector 41a of the photodetection unit 41, for instance. Because the laser beam 3 comprises the fan-shaped beams 3a, 3b and 3c, light can be received even when the photodetector 41a is a spot-like photodetection element. There is no need to perform accurate positioning for the photodetection device 2.

When the laser beam 3 runs across the photodetector 41a, each of the fan-shaped beams 3a, 3b and 3c passes through the photodetector 41a. From the photodetector 41a, three photodetection signals 51a, 51b and 51c corresponding to the fan-shaped beams 3a, 3b and 3c respectively are issued.

Figure 10A:
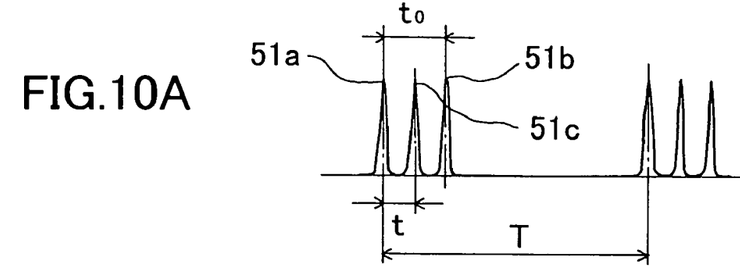
FIG. 10(A) and FIG. 10(B) each represents a drawing to explain a photodetection signal from a photodetection device.

When the photodetector 41a at a position of a point A as shown in FIG. 6–FIG. 9 with respect to the laser beam 3, i.e. when the photodetector 41a is at the center of the laser beam 3, the photodetection signal is as shown in FIG. 10(A), and time intervals "t" between the two signals in the three photodetection signals 51a, 51c and 51b are equal to each other (=t0/2). The rotating unit 7 is driven by rotation at a constant speed. In the figure, T represents a period of one turn of the laser beam 3.

Figure 7:
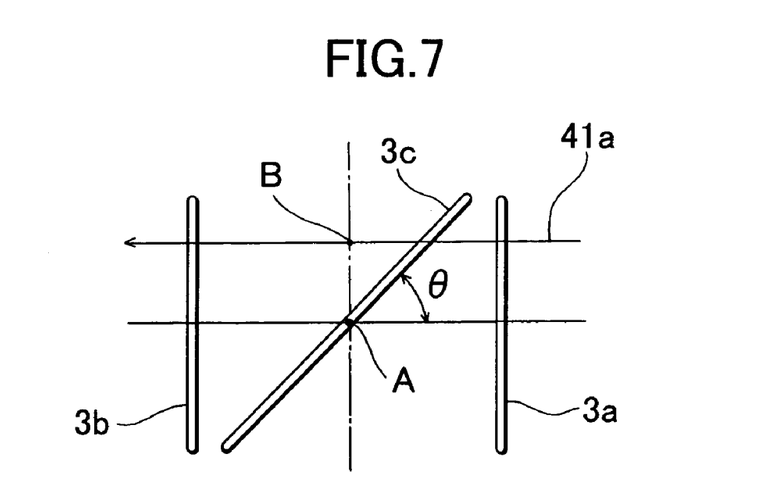
FIG. 7 is a front view to explain operation of the embodiment of the present invention.
Figure 10B:
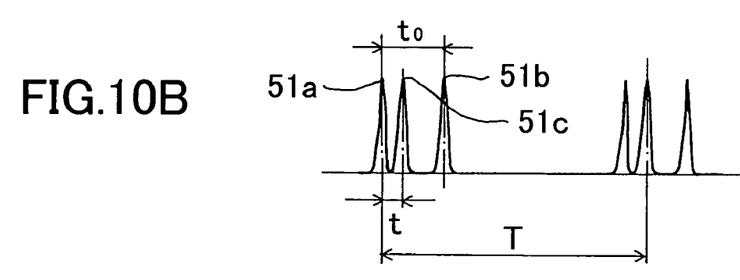

When the photodetector 41a is deviated from the center of the laser beam 3 and is at a position of a point B as shown in FIG. 6–FIG. 9, time intervals of the photodetection signals 51a, 51c and 51b are different from each other (FIG. 10(B)). In FIG. 7, if it is assumed that the photodetector 41a is relatively shifted from the right to the left in the figure (the laser beam 3 is shifted from the left to the right in the figure), the time interval "t" between the photodetection signals 51a and 51c is shorter, and the time interval "It" between the photodetection signals 51c and 51b is longer.

FIG. 6 shows similar figures regardless of the distance between the photodetection device 2 and the rotating unit 7. Thus, by finding a ratio of time intervals, a passing position in the figure turned to dimensionless can be calculated. Therefore, regarding the photodetector 41a, the elevation angle γ1 up to the point B with the rotating unit 7 as the center can be calculated by the following equation (1).

$$\gamma 1 = \delta(1-2t1/t0)\tan\theta \quad (1)$$

Similarly, the elevation angle γ2 of the photodetector 41b can be calculated by the following equation (2).

$$\gamma 2 = \delta(1-2t2/t0)\tan\theta \quad (2)$$

Further, from the elevation angles γ1 and γ2 and the distance D, the distance L between the rotary laser system 1 and the photodetection device 2 can be calculated by the following equations.

Figure 11:
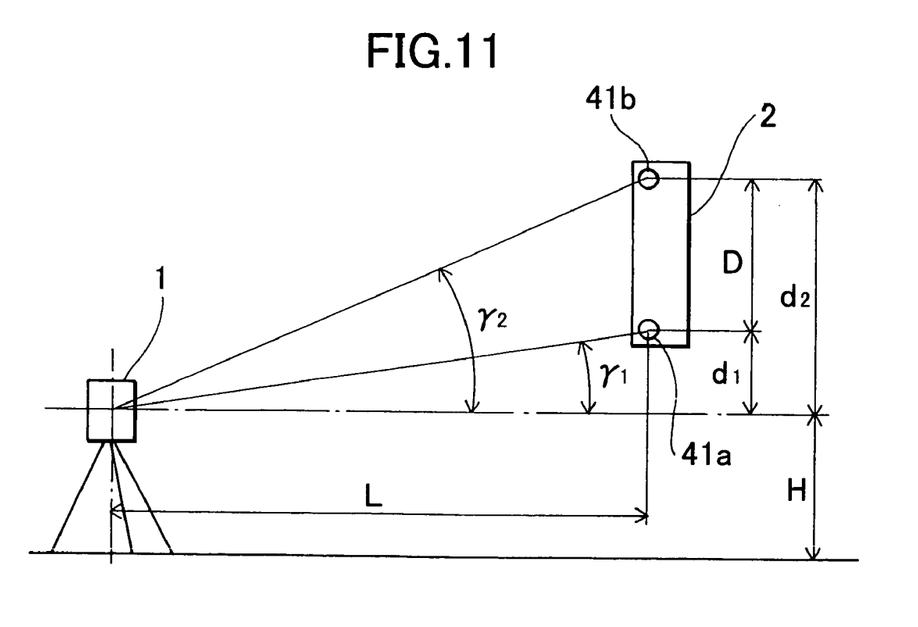
FIG. 11 is a drawing to explain distance measurement in the embodiment of the present invention.

Now, description will be given below referring to FIG. 11.

If it is assumed that a distance from the horizontal position to the photodetector 41a is d1 and a distance to the photodetector 41b is d2, the distance L can be calculated from the following equations:

$$d1 = L\tan(\gamma 1) \quad (3)$$

$$d2 = L\tan(\gamma 2) \quad (4)$$

$$D+d1 = d2 \quad (5)$$

Therefore, $$L = D/(\tan(\gamma 2)-\tan(\gamma 1)) \quad (6)$$

When the distance L is determined, differences of height d1 and d2 to the photodetectors 41 and 41b respectively can be calculated by the equations (3) and (4).

The above described distance L is determined by assuming that the rod 8 is at the vertical position. When the rod 8 is held by an operator, the rod 8 may be tilted. When the rod 8 is tilted toward a left or right direction facing to the rotary laser system 1, there is a time difference when the fan-shaped beams 3a and 3b in the vertical direction are received by the photodetectors 41a and 41b. Thus, the tilting can be compensated based on the time difference.

Figure 12:
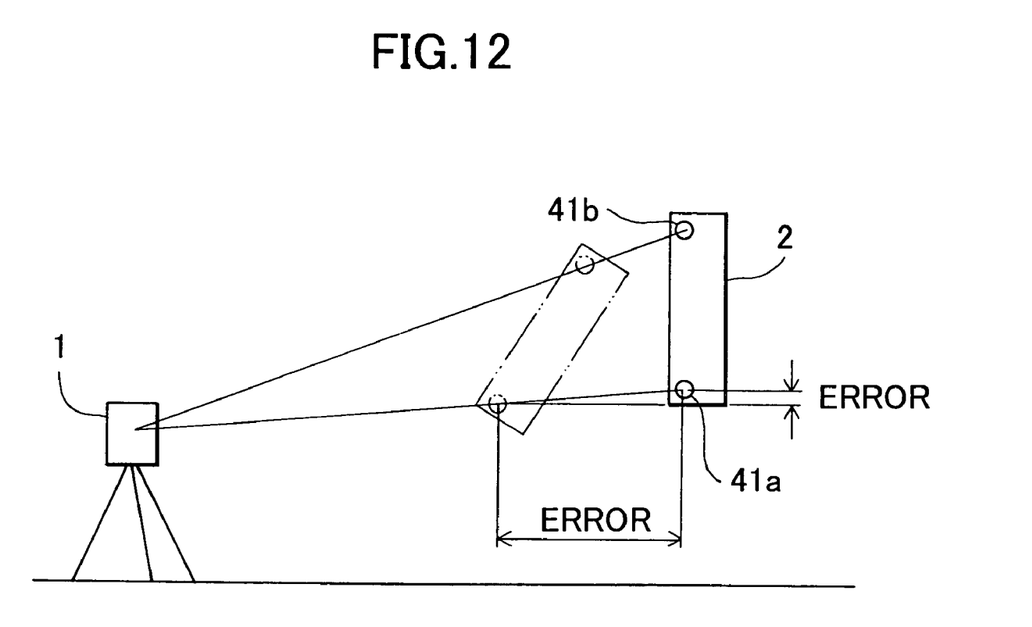
FIG. 12 is a drawing to explain operation of the embodiment of the present invention.

When the rod 8 is tilted in a front-to-back direction facing to the rotary laser system 1, the tilting of the rod 8 is not reflected in the elevation angle as shown in FIG. 12, and an error may occur. If a tilt detecting device is provided on the photodetection device 2 and the rod 8 is held in the vertical direction, the distance can be calculated without an error. Therefore, the distance between the rotary laser system 1 and the photodetection device 2 can be measured without the need of providing a distance-measuring device on the rotary laser system 1.

Next, description will be given on a case where three photodetectors are provided on the photodetection device 2. When three photodetectors are provided on the photodetection device 2, a tilt angle and a tilting direction of the rod 8 can be detected according to the photodetection signals from the photodetectors. The distance L thus measured can be compensated, and the distance L can be measured accurately even when the rod 8 is not held at the vertical position.

FIG. 13 shows the photodetection device 2 when there are provided three photodetectors 41.

Figure 13A:
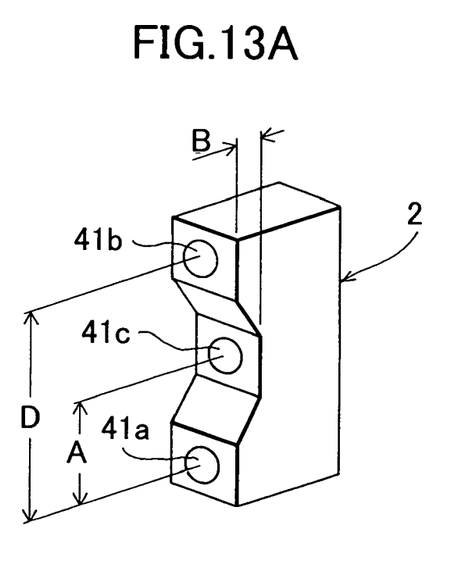
FIG. 13(A), FIG. 13(B), FIG. 13(C), and FIG. 13(D) each represents a schematical perspective view of a photodetection device to be used in the present invention.

A photodetector 41c is provided between the photodetectors 41a and 41b. A distance between the photodetector 41c and the photodetector 41a is A, and the photodetector 41c is arranged at a position recessed by a distance B from a line connecting the photodetector 41a with the photodetector 41b.

Figure 14:
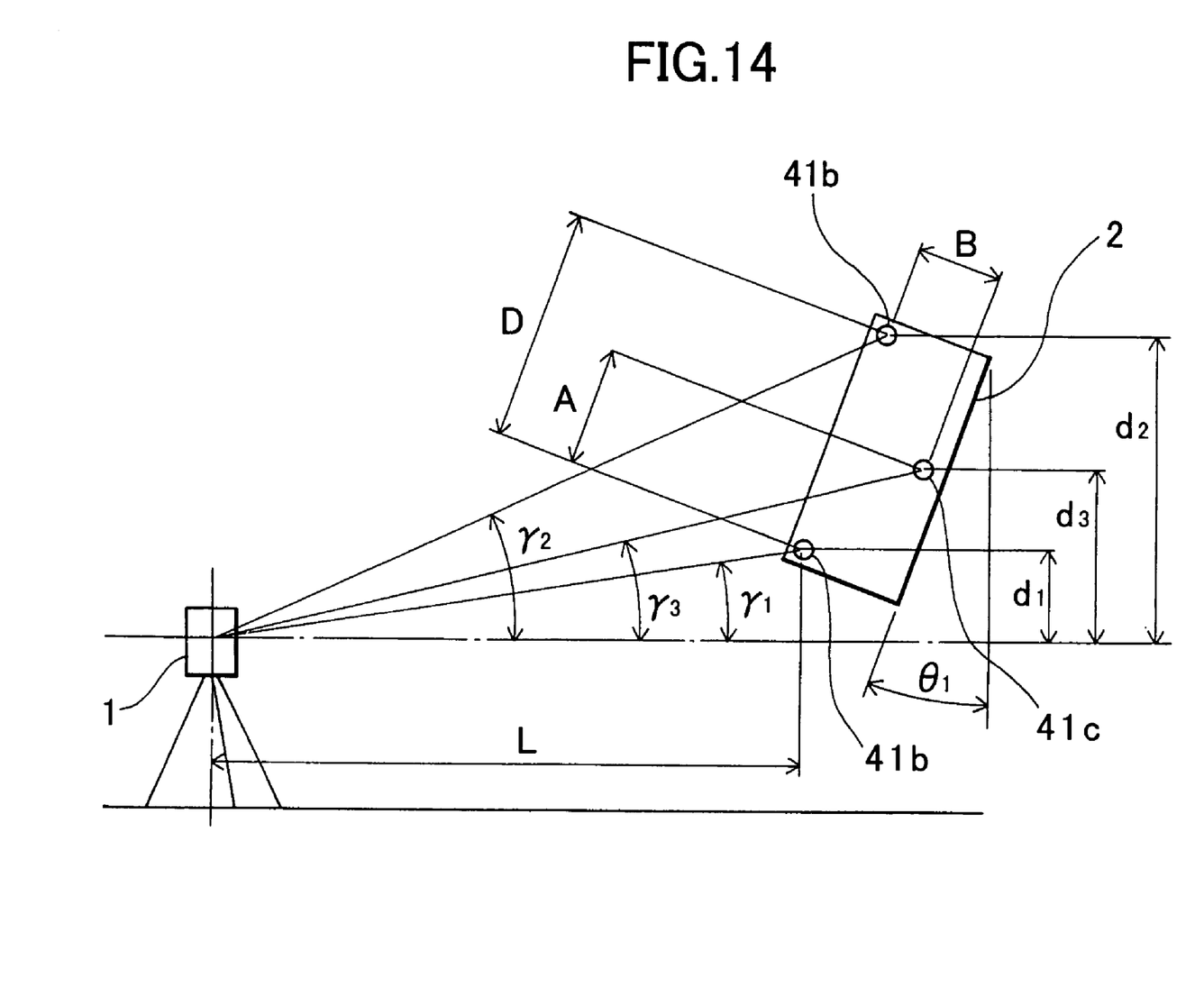
FIG. 14 is a drawing to explain operation of another embodiment of the present invention.

FIG. 14 shows a case where the rod 8 is tilted at an angle of θ1 in the front-to-back direction facing to the rotary laser system 1. In this case, too, the elevation angles γ1, γ2 and γ3 can be obtained with respect to the photodetectors 41a, 41b and 41c respectively as described above. Because distances A, B and D at the photodetection device 2 are already known, differences of height d1, d2 and d3 of the photodetectors 41a, 41b and 41c can be obtained from the following equations:

$$d1 = L\tan(\gamma 1) \quad (7)$$

$$d2 = (L + D\sin(\theta 1))\tan(\gamma 2) \quad (8)$$

$$d3 = (L + A\sin(\theta 1) + B\cos(\theta 1))\tan(\gamma 3) \quad (9)$$

$$d2 = d1 + D\sin(\theta 1) \quad (10)$$

$$d3 = d1 + A\cos(\theta 1) - B\sin(\theta 1) \quad (11)$$

Further, when the elevation angles γ1, γ2, and γ3 and the differences of height d1, d2 and d3 are determined, an error in the horizontal direction (See FIG. 12) can be obtained, and the measured distance between the rotary laser system 1 and the photodetection device 2 can be compensated. When the rod 8 is tilted in a left-to-right direction facing to the rotary laser system 1, a time difference occurs when the photodetectors 41a and 41b receive the vertical fan-shaped beams 3a and 3b as described above. Thus, the tilting can be compensated according to the time difference.

Figure 15:
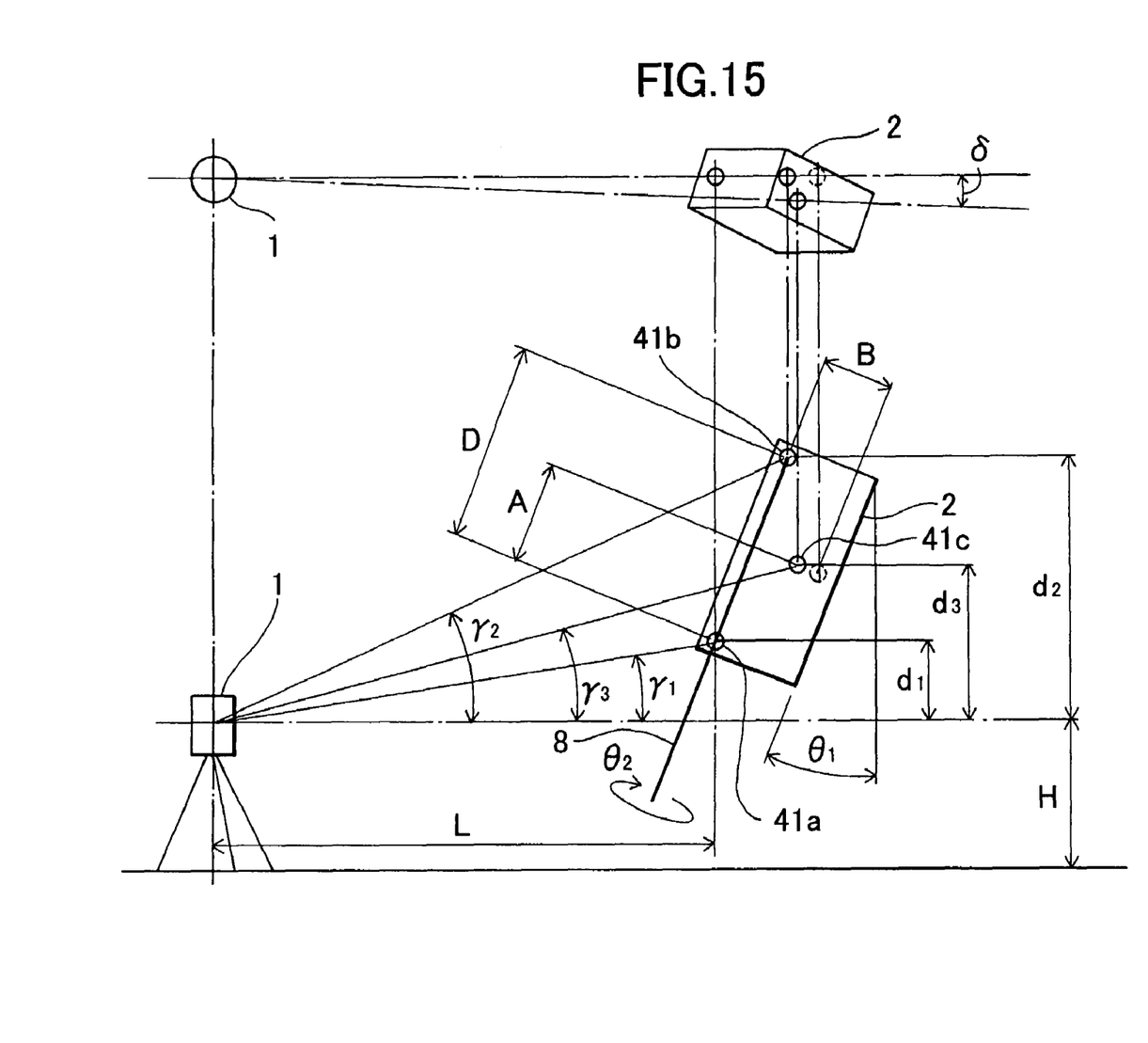
FIG. 15 is a drawing to explain operation of the another embodiment of the present invention.

FIG. 15 shows a case where the rod 8 is tilted at an angle of θ1 in a front-to-back direction facing to the rotary laser system 1 and where the rod 8 is further twisted at an angle of θ2 around the axis.

Figure 16:
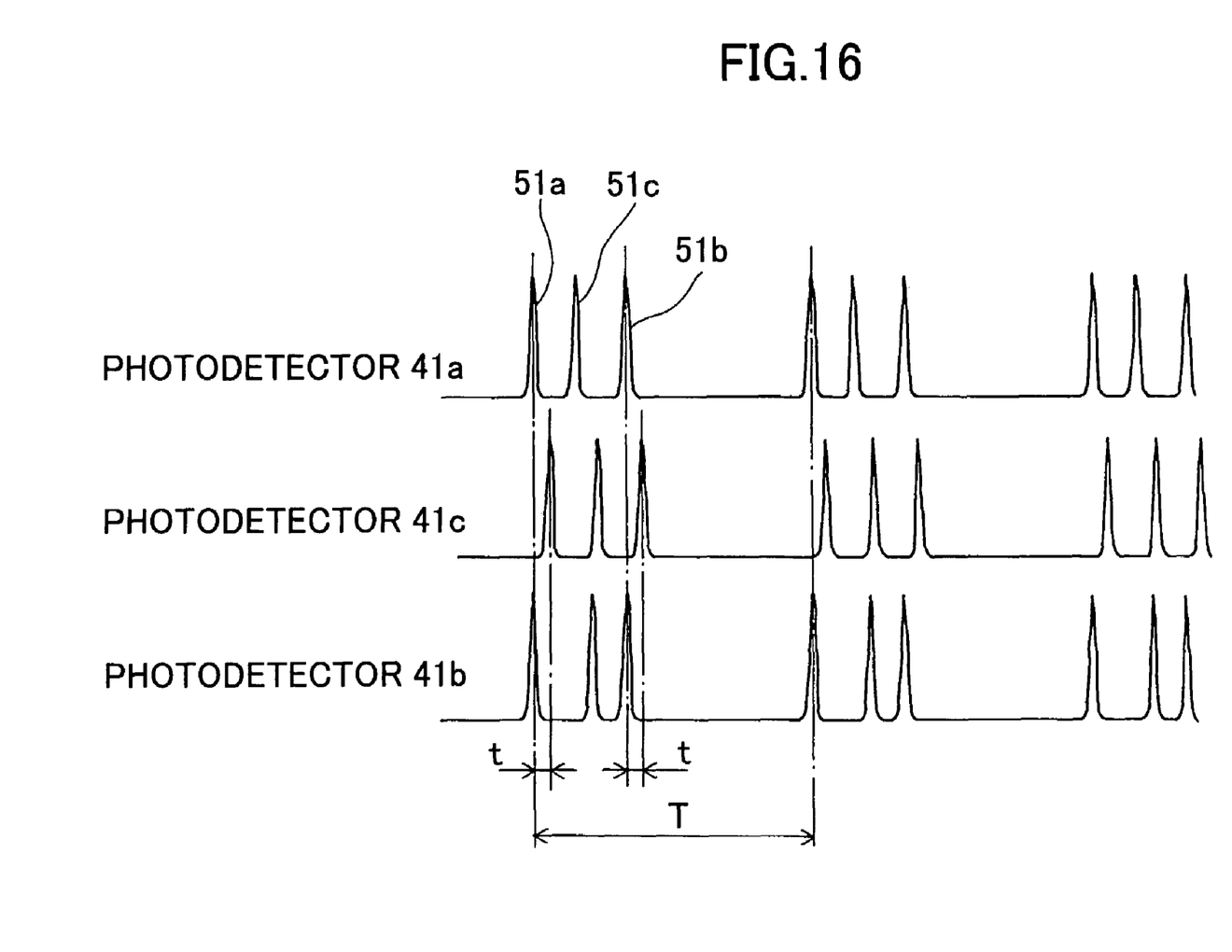
FIG. 16 shows graphs of photodetection signals of the photodetection device in the another embodiment of the present invention.

In this case, too, elevation angles γ1, γ2 and γ3 can be obtained with respect to the photodetectors 41a, 41b and 41c respectively. Further, when the rod 8 is twisted, the photodetector 41c is deviated from a vertical plane including the photodetectors 41a and 41b. Because the fan-shaped beams 3a and 3b are spread in a vertical direction, light receiving time of the photodetector 41c is deviated by an amount of "t" with respect to the photodetectors 41a and 41b as shown in FIG. 16.

Here,

δ=2πt/T (See FIG. 10. T represents a period of rotation of the laser beam.)

From geometrical relationship shown in FIG. 15, $$\tan(\delta) = B\sin(\theta 2)/(L + A\sin(\theta 1) + B\cos(\theta 1) \times \cos(\theta 2)) \quad (12)$$

$$\therefore \tan(2\pi t/T) = B\sin(\theta 2)/(L + A\sin(\theta 1) + B\cos(\theta 1) \times \cos(\theta 2)) \quad (13)$$

Also, $$d1 = L\tan(\gamma 1) \quad (14)$$

$$d2 = (L + D\sin(\theta 1))\tan(\gamma 2) \quad (15)$$

$$d3 = (L + A\sin(\theta 1) + B\cos(\theta 1) \times \cos(\theta 2))\tan(\gamma 3) \quad (16)$$

$$d2 = d1 + D\sin(\theta 1) \quad (17)$$

$$d3 = d1 + A\cos(\theta 1) - B\sin(\theta 1) \times \cos(\theta 2) \quad (18)$$

Thus, it is possible to obtain the differences of height d1, d2 and d3 of the photodetectors 41a, 41b and 41c, the horizontal distance L between the photodetector 41a of the photodetection device 2 and the rotary laser system 1, the tilt angle θ1 of the rod 8, and the twist angle θ2 of the rod 8. Based on the elevation angles γ1, γ2 and γ3, the differences of height d1, d2 and d3, the horizontal distance L, the tilt angle θ1 and the twist angle θ2, the horizontal error of the photodetectors 41a, 41b and 41c can be obtained, and the measured distance between the rotary laser system 1 and the photodetection device 2 can be compensated.

When the rod 8 is tilted in a left-to-right direction facing to the rotary laser system 1, signal difference occurs between the signals of the photodetector 41a and the photodetector 41b in FIG. 16. Thus, the tilting can be compensated based on the time difference.

In a configuration formed by a plurality of fan-shaped beams, the configuration may be not be N-shaped. It will suffice if at least one of the fan-shaped beams is tilted and a tilt angle and the like relating to the configuration are known.

Figure 13B:
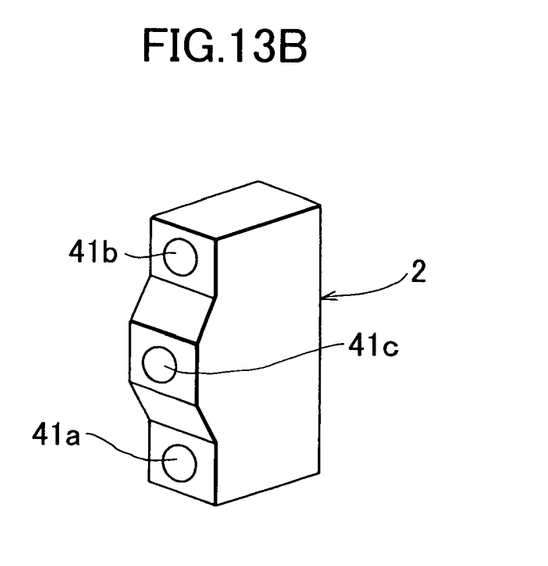
Figure 13C:
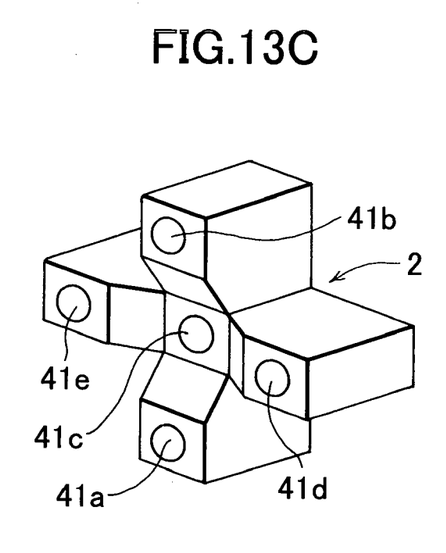
Figure 13D:
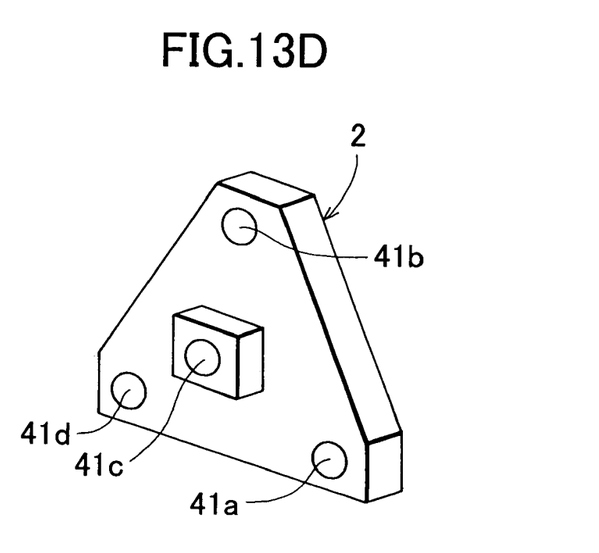

Various changes and modifications can be made on the number and the arrangement of the photodetectors in the photodetection device 2 as shown in FIG. 13(B)–FIG. 13(D). FIG. 13(A)–FIG. 13(D) show such arrangement that one of the photodetectors, i.e. the photodetector 41c, is deviated from a plane, in which the other photodetectors 41a, 41b, 41d and 41e are included. All of the photodetectors 41 may be within the same plane. With respect to the number and the arrangement of the photodetectors 41, it will suffice if there are at least three photodetectors 41 and the three photodetectors 41 are not on the same line.

As described above, even when the rotary laser system 1 may not comprise a distance-measuring unit and the photodetection device 2 may not comprise a tilt sensor, it is possible to measure the distance between the rotary laser system 1 and the photodetection device 2 with high accuracy.

A GPS measuring device may be provided on the photodetection device 2. For instance, the GPS measuring device is provided at an upper end of the rod 8, and a distance between the GPS measuring device and the lower end of the rod 8 is already known. By providing the GPS measuring device, an absolute plane position of the GPS measuring device can be measured. A distance between the photodetection device 2 and the rotary laser system 1 can be calculated from the position measured by the GPS measuring device and from the position of a known point where the rotary laser system 1 is installed. Further, tilting of the rod 8 can be measured by the photodetection device 2. Because the distance between the lower end of the rod 8 and the GPS measuring device is already known, an error caused by the tilting of the rod 8 can be compensated, and the distance measurement can be achieved with high accuracy.

In this case, too, a distance can be measured without worrying about the tilting of the rod 8, and this alleviates the burden on the operator.

What is claimed is:

1. A photodetection device for a rotary laser system for projecting by rotary irradiation at least two fan-shaped beams tilted at a known angle with respect to a horizontal plane and having a known spreading angle, comprising at least three photodetectors arranged in a known relationship, wherein at least one of said photodetectors is provided at a position recessed or protruded by a known distance from a line connecting the remaining at least two photodetectors.

2. A photodetection device for a rotary laser system according to claim 1, wherein at least two of said photodetectors are provided on a plane facing to said rotary laser system, and at least one of said photodetectors is provided at a position recessed or protruded from the plane by a known distance.

3. A photodetection device for a rotary laser system according to claim 1, wherein said photodetection device comprises an arithmetic operation unit, wherein said arithmetic operation unit calculates a distance between said rotary laser system and said photodetection device, and a tilt angle in a front-to-back direction of said photodetection device with respect to said rotary laser device based on time difference in the receiving of the fan-shaped beams by said photodetectors.

4. A photodetection device for a rotary laser system according to claim 1, wherein said photodetection device comprises an arithmetic operation unit, said arithmetic operation unit calculates a tilt angle and a twist angle of said photodetection device based on a distance between said rotary laser system and said photodetection device and based on time difference in the receiving of the fan-shaped beams by said photodetectors.

5. A photodetection device for a rotary laser system according to claim 4, wherein the distance between said rotary laser system and said photodetection device is compensated based on the tilt angle and the twist angle of said photodetection device.

6. A photodetection device for a rotary laser system according to claim 1, wherein said rotary laser system is installed at a known point, said photodetection device comprises a GPS measuring device and an arithmetic operation unit, said arithmetic operation unit calculates a distance between said rotary laser system and said photodetection device based on a result of measurement by said GPS measuring device, a tilt angle of said photodetection device is calculated based on the calculated distance and based on time difference of the receiving of the fan-shaped beams by said photodetectors, and the result of measurement by said GPS measuring device is compensated based on the tilt angle.

* * * * *